2,877,157
Patented Mar. 10, 1959

2,877,157

Δ⁸⁽¹⁴⁾-9α-SUBSTITUTED NORANDROSTENE DERIVATIVES

Eugene J. Agnello and Gerald D. Laubach, Jackson Heights, N. Y., assignors to Chas. Pfizer & Co., Inc., New York, N. Y., a corporation of Delaware No Drawing. Application September 4, 1958
Serial No. 758,918

7 Claims. (Cl. 167—65)

This application is concerned with new and useful steroid compounds and with compositions containing them. More particularly, it is concerned with certain 9α-substituted-Δ⁸⁽¹⁴⁾-derivatives of norandrostene particularly useful as anabolic agents but also possessing appreciable activity as progestagens and as estrogen antagonists.

The useful compounds of this invention include those represented by the formula

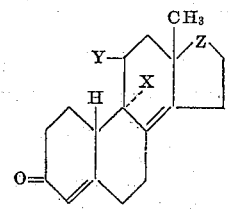

and the Δ⁶-dehydro derivatives thereof wherein X is selected from the group consisting of fluorine, chlorine, bromine, iodine, methoxy and ethoxy; Y is selected from the group consisting of keto and β-hydroxyl and Z is selected from the group consisting of

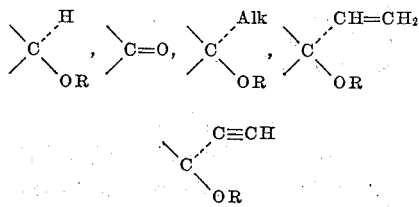

or $$\diagdown_{C}\diagup^{C \equiv CH}_{OR}$$

R is selected from the group consisting of hydrogen and acyl hydrocarbon containing up to ten carbon atoms and Alk is selected from the group consisting of alkyl groups containing up to three carbon atoms.

Suitable starting materials for the preparation of the active agents of this invention include those having the formula

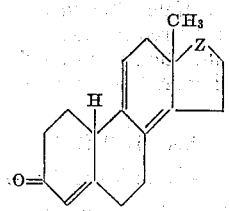

wherein Z has the same meaning as above. These compounds are prepared in accordance with the procedures set forth in copending and concurrently filed patent application Serial No. 758,916 which describes their preparation from the corresponding 11β-hydroxyl compound by dehydration using p-toluenesulfonic acid or preferably using methylsulfonyl chloride in pyridine. In this preferred method the starting compound is allowed to stand together with an excess of methylsulfonyl chloride in pyridine at a low temperature, for example, −5 to +5° C. for a period of from about 16 to about 30 hours. The desired compound is isolated by evaporating the solvent in vacuo.

An hydroxyl group and a substituent at the 9α-position are introduced into the starting compounds of this invention using the procedure of Fried and Sabo as described in the Journal of the American Chemical Society, vol. 79, page 1130. This article describes the preparation of a bromohydrin using N-bromoacetamide and perchloric acid in peroxide-free dioxane. The 9α-bromo-11β-hydroxy compound is converted to a 9β,11β-oxide using potassium acetate. These 9,11-oxides are claimed in the above identified patent application. For the preparation of the other 9α-substituted compounds of this invention the Δ⁹⁽¹¹⁾-compound is treated with a halogen acid or with methanol or ethanol in the presence of 72% perchloric acid. These procedures are fully illustrated in the appended examples.

The Δ⁶-dehydro compounds of this invention can be prepared from the above described compounds by application of the reactions set forth in earlier filed patent applications Serial No. 526,554, filed August 4, 1955, and Serial No. 633,538, filed January 10, 1957. These applications described the method for the introduction of double bonds at the 6(7)-position by dehydrogenation of a 3-keto-6-dihydro-Δ⁴-steroid compound with a quinone having an oxidation-reduction potential less than −0.5 at a temperature of between 70° C. and 190° C. in an inert organic solvent having a boiling point of at least about 70° C. These solvents include mono-nuclear aromatic hydrocarbons, mono-nuclear halogenated aromatic hydrocarbon solvents, oxygenated polar alicyclic organic solvents and oxygenated polar aliphatic organic solvents. Typical solvents include tertiary butanol, n-amyl alcohol, hexanol, isoamyl alcohol, heptanol-3, cyclohexanol, ortho-dichlorobenzene, xylene, tertiary amyl alcohol, secondary amyl alcohol, benzene, toluene, acetic acid, propionic acid, butyric acid, butyl acetate, amyl acetate, hexyl acetate, butyl propionate, propyl propionate and amyl propionate. The preparation of the valuable compounds of the instant invention using the process described in the earlier filed applications is more fully illustrated in the appended examples.

Various modifications at the C₁₇ position can be made by procedures well known in the art. For conversion of the 17-keto group to a 17-hydroxyl group the 3-keto group is preferentially converted to a pyrrolidinyl derivative, the 17-keto group is then reduced with lithium aluminum hydride and the pyrrolidinyl group removed by refluxing in a sodium acetate-acetic acid buffered aqueous-methanol solution. This reaction is described in detail by Heyl and Herr in the Journal of the American Chemical Society, vol. 75, page 1918 (1953). The vinyl group can be introduced at the C₁₇ position by treating the 17-ketone with acetylene in the presence of a potassium tert-alkoxide (for example, potassium tert-amyl alkoxide) and reducing the thus produced ethynyl group by catalytic hydrogenation. For the introduction of the vinyl group the 3-keto group should again be protected by a pyrrolidinyl group which is, of course, subsequently removed. The 17-keto group can be converted to a tertiary alcohol, that is, an alkyl and hydroxyl group can be introduced at the 17-position by treatment with an organo-metallic compound of the type RLi or RMgX wherein R is alkyl up to four and X is a halogen. For the introduction of the vinyl group or the reaction with an organo-metallic compound the 3-keto group should be protected by a pyrrolidinyl group as described above. A 17-hydroxyl group can be readily esterified with the usual esterifying agents if it is the hydroxyl group of a secondary alcohol. If it is the hydroxyl of a tertiary alcohol it can be esterified by refluxing in a liquid anhydride, for example, acetic or propionic anhydride or in the case of a solid anhydride by heating the compound at about 100° C. in a hydrocarbon solvent solution such as xylene containing the anhydride and catalytic amounts of potassium acetate. Esters and acid esters of the 17-hydroxyl group can be obtained in this manner. An 11β-hydroxyl group can be converted to a keto group by oxidation, for example, with chromic acid. If, however, there is a secondary hydroxyl group at the 17-position, it is best to acylate this group before oxidizing the group at the 11-position. As stated above, all of these reactions are conventional in the art.

Although the reactions described above are applicable to compounds in which the 17-position carries a free β-hydroxyl group, for optimum results it is best that this hydroxyl group be acylated with an acyl hydrocarbon group containing up to ten carbon atoms. The term "acyl hydrocarbon" includes acyl hydrocarbon groups containing only carbon, hydrogen and oxygen derived from monocarboxylic or dicarboxylic acids. In the event that the acyl hydrocarbon group is one derived from a dicarboxylic acid, it is often advantageous to treat the isolated therapeutically active compound with a base derived from an alkali metal or alkaline earth metal to prepare a metal salt. These bases include, for example, sodium, potassium, barium and calcium hydroxide as well as the corresponding carbonates and bicarbonates. Products so prepared are especially useful because of their increased solubility in water.

The 11β-hydroxyl compound of this invention is converted to the valuable 11-keto compound by oxidation. The oxidative step may be performed before or after isomerization. There are a number of reagents available for this oxidation and these include, for example, chromium dioxide, sodium dichromate, the chromic acid-pyridine complex, N-bromoacetamide and aluminum isopropoxide or aluminum tert-butoxide in the presence of a hydrogen acceptor such as acetone or cyclohexanone in an inert organic solvent such as benzene, toluene or xylene. These reactions are best applied to compounds in which the β-hydroxyl group at the 17-position is acylated with an acyl hydrocarbon group of the type described above.

The products of this invention as stated above are valuable medicinal agents being particularly useful for their anabolic activity, that is, for their aid in rebuilding human tissue injured by surgery or depleted by serious illness. When used in the treatment of these conditions the compounds of this invention are administered in dosages of approximately the same order of magnitude as other agents often recommended for these purposes such as 17α-ethyl-17-hydroxy-norandrostene; 11β,17β-dihydroxy-9α-fluoro-17α-methyl-4-androstene-3-one or 11β,-17β-dihydroxy-17α-methyl-4-androstene-3-one. Because of their high order of activity, it is sometimes possible to use dosages of the compounds of this invention which are lower than compounds presently utilized. They accomplish their valuable therapeutic effect with a minimum of undesirable androgenic activity. For this reason, and because they are effective at relatively low levels, they can be administered for extended periods of time to patients of either sex.

The biologically active compounds of this invention may be administered alone or in combination with acceptable pharmaceutical carriers, the choice of which is determined by the preferred route of administration, the solubility of the compound and standard pharmaceutical practice. For oral administration the compounds may be administered in the form of tablets containing excipients such as starch or milk sugar. Aqueous solutions and elixirs which may be sweetened or flavored may also be employed. For intra-articular injection aqueous suspensions may be used. In this case various suspending and wetting agents may be added to the composition to obtain a suspension not tending to settle out easily or to pack down in the bottle in which it is stored. Intra-muscular and subcutaneous dosage forms may also be prepared by standard pharmaceutical practice.

The following examples are given solely for the purpose of illustration and are not to be construed as limitations of this invention, many apparent variations of which are possible without departing from the spirit or scope thereof.

EXAMPLE I

*9α-bromo-$\Delta^{4,8(14)}$-19-norandrostadiene-11β-ol-3,17-dione*

To a suspension of $\Delta^{4,8(14),9(11)}$-19-norandrostatriene 3,17-dione, prepared as described in copending and concurrently filed patent application Serial o. 758,916, (2.4 g.) in pure peroxide free dioxane (20 ml.) 3.65 ml. of 0.46 N perchloric acid was added in the dark at room temperature with stirring during a one hour period 1.14 g. of N-bromoacetamide. At the end of 2 hours, all of the starting material had dissolved and 2.5 ml. of sodium sulfite solution was added with stirring. A few grams of ice in 20 ml. of chloroform was added and the layers separated. The organic layer was washed twice with water while maintaining the temperature at about 20° C. by the occasional addition of ice. The organic solution was concentrated in vacuo and triturated in acetone. The mixture was maintained at a temperature of about 5° C. and the desired product recovered by filtration.

The corresponding $\Delta^{4,6}$-compound is similarly prepared.

EXAMPLE II

*9β,11β-oxido-$\Delta^{4,8(14)}$-19-norandrostadiene-3,17-dione*

A solution of 2.3 g. of the compound prepared in the previous example in 75 ml. of dioxane was added to a solution of 15.8 g. of anhydrous potassium acetate in 160 ml. of absolute alcohol at a temperature just below the reflux temperature of the alcohol solution. The mixture was brought to reflux within three minutes and the reaction allowed to proceed for a total of forty minutes. After cooling in an ice bath, 400 ml. of ice water was added with stirring and the desired product precipitated. Successive crops of the desired product were obtained by concentrating the mother liquor.

The corresponding $\Delta^{4,6}$-compound is prepared similarly.

EXAMPLE III

*9α-fluoro-$\Delta^{4,8(14)}$-19-norandrostadiene-11β-ol-3,17-dione*

Approximately six g. of anhydrous hydrogen fluoride was passed into a solution containing five g. of the compound of Example II in 100 ml. of redistilled chloroform at 0° C. with constant stirring. The reaction mixture was maintained at this temperature for 2 hours and then rendered alkaline by the careful addition of aqueous sodium bicarbonate solution. The reaction mixture was extracted with chloroform, the organic layer dried over anhydrous sodium sulfate, filtered and the filtrate evaporated to leave the desired product as a residue. It was purified by recrystallization from ethyl acetate.

The corresponding $\Delta^{4,6}$-compound is similarly prepared.

EXAMPLE IV

*9α-chloro-$\Delta^{4,8(14)}$-19-norandrostadiene-11β-ol-3,17-dione*

A solution of 4 g. of the compound prepared in Example II in 40 ml. of redistilled chloroform was prepared and 3.5 ml. of an 0.45 N hydrogen chloride in chloroform solution was added over a twenty minute period. The reaction mixture was maintained at 0° C. for an additional hour. Water was added and the chloroform solution washed and evaporated to dryness in vacuo. The crystalline residue was recrystallized from acetone to provide the desired product in crystalline form.

The corresponding $\Delta^{4,6}$-compound is similarly prepared.

EXAMPLE V

*9α-iodo-Δ⁴,⁸⁽¹⁴⁾-19-norandrostadiene-11β-ol-3,17-dione*

A solution of 204 mg. of the compound prepared in the previous example in 20 ml. of chloroform was cooled to −20° C. and 0.4 ml. of 55% aqueous hydriodic acid was added. The mixture was agitated for 20 minutes, water was added and the layers separated. Careful evaporation of the solution in vacuo left a crystalline residue which was purified by crystallization of ethyl acetate keeping the temperature below 40° C.

The corresponding Δ⁴,⁶-compound is similarly prepared.

EXAMPLE VI

*9α-methoxy-Δ⁴,⁸⁽¹⁴⁾-19-norandrostadiene-11β-ol-3,17-dione*

A solution of the compound of Example II (5 g.) in 250 ml. of methanol and 1.9 ml. of 72% perchloric acid was allowed to remain at room temperature for four hours. The solution was neutralized with aqueous sodium bicarbonate and the methanol removed in vacuo. The mixture was extracted with chloroform and the chloroform evaporated in vacuo to provide the desired compound as the free alcohol which was converted to the corresponding acetate by acetylation with 5 ml. of acetic anhydride in an equal volume of pyridine for 15 hours. The crystalline product was obtained by evaporation of the solution in vacuo.

The corresponding Δ⁴,⁶-compound is similarly prepared.

EXAMPLE VII

*9α-ethoxy-Δ⁴,⁸⁽¹⁴⁾-19-norandrostadiene-11β-ol-3,17-dione*

A solution of the compound of Example II (5 g.) in 250 ml. of ethanol and 1.9 ml. of 72% perchloric acid was allowed to remain at room temperature for 4 hours. The solution was neutralized with aqueous sodium bicarbonate and the ethanol removed in vacuo to provide the desired compound as the free alcohol which was converted to the corresponding acetate by acetylation with 5 ml. of acetic anhydride in an equal volume of pyridine for 15 hours. The crystalline product was obtained by evaporation of the solution in vacuo.

The corresponding Δ⁴,⁶-compound is similarly prepared.

EXAMPLE VIII

Compounds within the purview of the instant invention form a large but determinable number. The following list, which is given to avoid unnecessary repetition of experimental details, lists Δ⁴-9α-fluoro compounds of this invention. It is of course understood that the other corresponding halogen, methoxy and ethoxy compounds, 11-keto compounds and the Δ⁴,⁶-derivatives of these are also included within the scope of the invention.

9α-fluoro-Δ⁴,⁸⁽¹⁴⁾-19-norandrostadiene-11β,17β-diol-3-one 17-acetate
9α-fluoro-Δ⁴,⁸⁽¹⁴⁾-19-norandrostadiene-3,11,17-trione
9α-fluoro-Δ⁴,⁸⁽¹⁴⁾-19-norandrostadiene-17β-ol - 3,11,dione 17-acetate
9α-fluoro-Δ⁴,⁸⁽¹⁴⁾-19-norandrostadiene-11β-ol-3,17-dione
17α-vinyl-9α-fluoro-Δ⁴,⁸⁽¹⁴⁾-19 - norandrostadiene - 11β, 17β-diol-3-one 17-acetate
17α-ethynyl-9α-fluoro-Δ⁴,⁸⁽¹⁴⁾-19-norandrostadiene - 11β, 17α-diol-3-one 17-acetate
17α-methyl-9α-fluoro-Δ⁴,⁸⁽¹⁴⁾-19 - norandrostadiene - 11β, 17β-diol-3-one 17-acetate
17α-ethyl-9α-fluoro-Δ⁴,⁸⁽¹⁴⁾ - 19 - norandrostadiene - 11β, 17β-diol-3-one 17-acetate
17α-propyl-9α-fluoro-Δ⁴,⁸⁽¹⁴⁾ - 19 - norandrostadiene - 11β, 17β-diol-3-one 17-acetate
17α-vinyl-9α-fluoro-Δ⁴,⁸⁽¹⁴⁾-19-norandrostadiene - 17β-ol-3,11-dione 17β-acetate
17α-ethynyl-9α-fluoro-Δ⁴,⁸⁽¹⁴⁾-19-norandrostadiene - 17β-ol-3,11-dione 17β-acetate
17α-methyl-9α-fluoro-Δ⁴,⁸⁽¹⁴⁾-19-norandrostadiene - 17β-ol-3,11-dione 17β-acetate
17α-ethyl-9α-fluoro-Δ⁴,⁸⁽¹⁴⁾-19-norandrostadiene-17β - ol-3,11-dione 17β-acetate
17α-propyl-9α-fluoro-Δ⁴,⁸⁽¹⁴⁾-19-norandrostadiene - 17β-ol-3,11-dione 17β-acetate

EXAMPLE IX

The 17-acetates prepared as described above are all converted to free alcohols by alkaline hydrolysis using conventional procedures.

EXAMPLE X

A variety of 17-esters of the free alcohols prepared as described in the previous examples were each prepared by acylation using conventional methods. The compounds prepared include formates, propanoates, propenoates, isobutyrates, hexanoates, benzonoates, actanoates, decanoates, hemisuccinates, trimethyl acetates cyclopentylpropionates, etc. The acid esters of dicarboxylic acids such as the hemisuccinate have the advantage that alkali metal salts and alkaline earth metal salts can be prepared from them by treatment with molar proportions of a base such as sodium or potassium bicarbonate or barium hydroxide. These salts are water soluble, and advantage not possessed by the free alcohols themselves or by ordinary esters thereof.

What is claimed is:

1. A compound selected from the group consisting of those having the formula

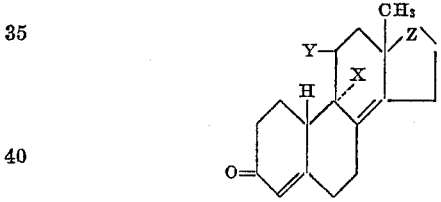

and the Δ⁶-dehydro derivatives thereof wherein X is selected from the group consisting of fluorine, chlorine, bromine, iodine, methoxy and ethoxy; Y is selected from the group consisting of keto and β-hydroxyl and Z is selected from the group consisting of

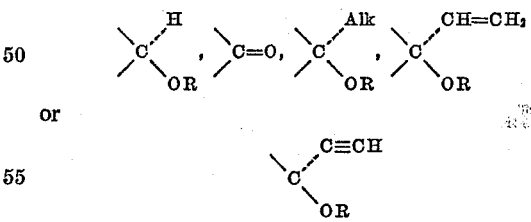

R is selected from the group consisting of hydrogen and acyl hydrocarbon containing up to ten carbon atoms and Alk is selected from the group consisting of alkyl groups containing up to three carbon atoms.

2. A pharmaceutical composition comprising a compound as claimed in claim 1 together with a pharmaceutically acceptable carrier.

3. 9α-bromo-Δ⁴,⁸⁽¹⁴⁾-19-norandrostadiene - 11β - ol-3,17-dione.

4. 9α-bromo-Δ⁴,⁶,⁸⁽¹⁴⁾-19-norandrostatriene - 11β - ol-3,17-dione.

5. 9α-fluoro-Δ⁴,⁸⁽¹⁴⁾-19-norandrostadiene-11β-ol - 3,17-dione.

6. 9α-fluoro-Δ⁴,⁶,⁸⁽¹⁴⁾-19-norandrostatriene - 11β - ol-3,17-dione.

7. 9α-chloro-Δ⁴,⁸⁽¹⁴⁾-19-norandrostadiene - 11β - ol - 3, 17-dione.

No references cited.